A. SCHUM.
PRESSURE REGULATOR.
APPLICATION FILED APR. 4, 1908.
No. 899,912.
Patented Sept. 29, 1908.
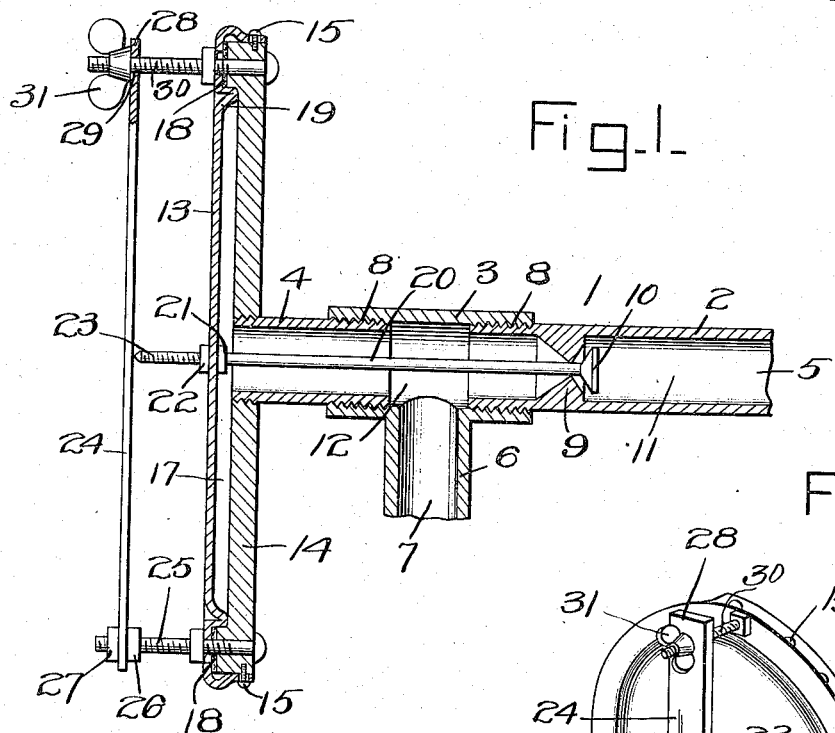
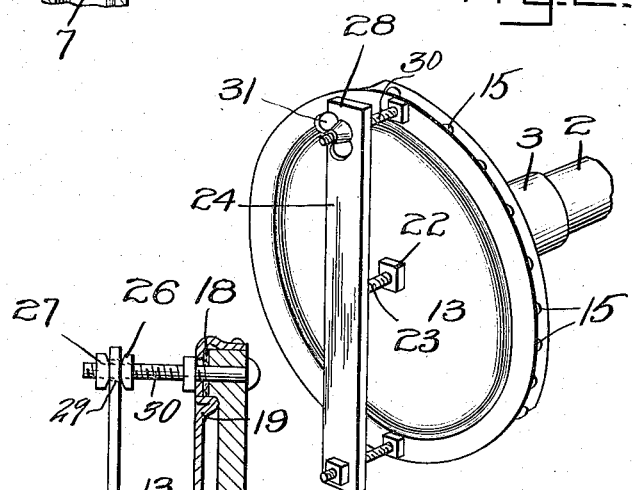
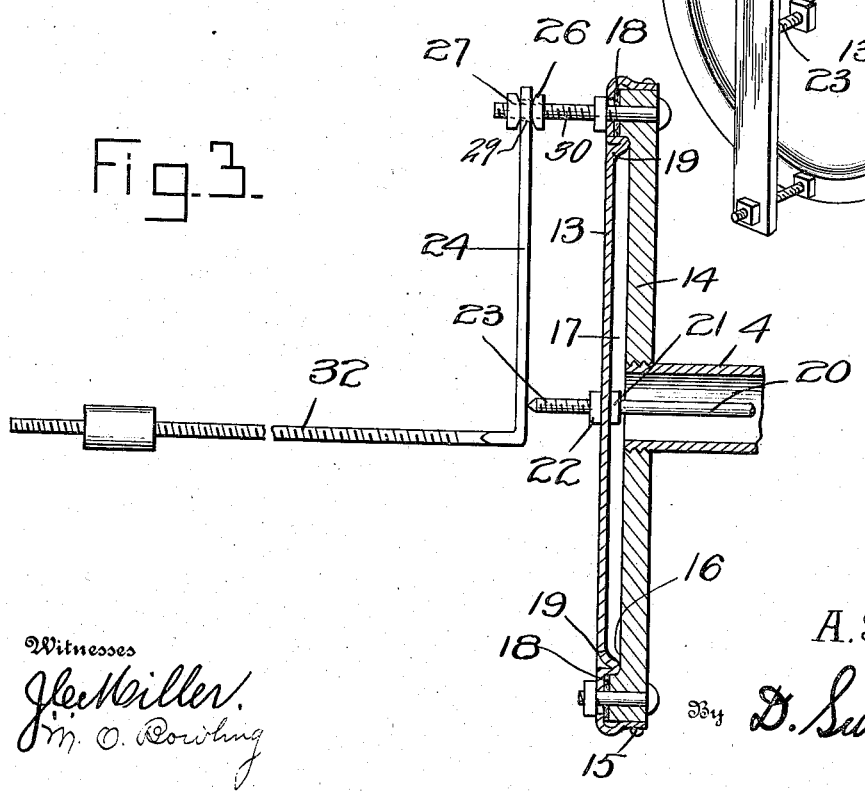
Witnesses
J. C. Miller
M. O. Rowling
Inventor
A. Schum,
By D. Swift
Attorneys

UNITED STATES PATENT OFFICE.

ANDREW SCHUM, OF MARIAH HILL, INDIANA.

PRESSURE-REGULATOR.

No. 899,912. Specification of Letters Patent. Patented Sept. 29, 1908.

Application filed April 4, 1908. Serial No. 425,087.

*To all whom it may concern:*

Be it known that I, ANDREW SCHUM, a citizen of the United States, residing at Mariah Hill, in the county of Spencer and State of Indiana, have invented a new and useful Pressure-Regulator; and I do hereby declare the following to be a full, clear, and exact description of the invention, such as will enable others skilled in the art to which it appertains to make and use the same.

This invention pertains to a new and useful high and low pressure regulator, and the invention in its broadest scope resides specifically in means for regulating high pressure of air or gas; this device may if desired be utilized for regulating high pressure of any fluid.

A further object of the invention is to provide a leaf spring pivoted or adjustably connected to one side of the disk, to which the diaphragm is fastened, having its free end provided with an aperture through which a stationary screw extends, upon the outer portion of which a thumb nut is mounted, by the manipulation of which the tension of the leaf spring may be regulated, so as to have a greater or a less amount of pressure against the extreme end of the valve rod of the device, as will be readily apparent from the drawings.

The regulator device comprises a shell having an inlet and outlet for that which passes therethrough, and is provided with a valve seat, against which or with which the valve coöperates. The valve is provided with the usual rod, which is adjustably connected to the diaphragm of the regulator, as clearly shown.

This invention comprises further objects and combinations of elements which will be hereinafter fully described, shown in the accompanying drawings, and the novel features thereof will be pointed out by the appended claims.

The features, elements and the arrangement thereof, which constitute the above entitled invention, may be changed and varied, that is to say, in an actual reduction to practice, as long as the changes and variations accruing from said reduction to practice are within the scope of the appended claims.

To obtain a full and correct understanding of the details of construction, combinations of features, elements and advantages, reference is to be had to the hereinafter set forth description and the accompanying drawings in connection therewith wherein Figure 1 is a vertical section through the regulator. Fig. 2 is a perspective view of the same, showing more clearly the leaf spring by which the diaphragm and valve is regulated. Fig. 3 is a sectional view through a modified form of the invention, in which a weighted member is employed, which is oscillated during high pressure of fluid, gas or air, for the purpose of regulating the same.

In regard to the drawings wherein similar reference characters indicate corresponding parts in the several illustrations, 1 designates the casing of the regulator which comprises three portions 2, 3 and 4, as clearly shown; the portion 2 is provided with an inlet 5 through which air, steam, gas or any fluid may enter, while the portion 3 is provided with a downwardly projecting tube 6 forming an outlet 7 for such air, gas, steam or fluid.

The three portions 2, 3 and 4 are connected together by a thread, as at 8, as clearly shown. Located in the portion 2 is a valve seat 9, with which the valve 10 coöperates, for the purpose of closing the entrance between the duct 11 of the portion 2 and the duct or passage 12 of the portion 3, thereby preventing that which is intended to pass through the regulator from reaching the outlet, that is when a high pressure of gases, or fluids act upon the diaphragm 13, which is fixed to the annular disk 14 by screw or any other suitable means 15, as clearly shown. There are numerous substances from which the diaphragm 13 may be formed, among those, some of which the applicant chooses to name the following; any suitable flexible metal having a sufficient amount of pliability, for instance, sheet tin, or any suitable fiber having similar characteristics, or a mixture of rubber and other substance, whereby a sufficient amount of stability may be effected, yet having the pliable feature, or any other suitable substance having the proper characteristics, for a device of this character. The nature of the diaphragm depends largely upon the use to which the device is applied. This disk 14 is recessed, as at 16, so as to form a space or chamber 17 between said disk and the diaphragm, as shown clearly in Fig. 1 of the drawings. Fixed between the diaphragm and the disk, that is, adjacent to the circumferences thereof is a suitable packing, 18, of felt and asbestos, for the purpose of preventing leakage, as will be clearly apparent.

The diaphragm near its outer portion is so formed, as at 19, as to allow sufficient expansion thereof, that is, when high pressure gases or fluids act thereon. Furthermore the outer portion is provided with apertures through which the bolts or screws 15 extend, which apertures are of larger diameter than the diameter of the screws or bolts, so as to allow a slight play of the diaphragm.

The valve 10 is provided with the usual valve rod 20, which is adjustably connected to the center of the diaphragm by the nuts 21 and 22, which engage opposite faces of said diaphragm. The valve rod is extended slightly beyond the nut 22, as at 23, and in close proximity to the regulating spring or member 24, as shown clearly in Figs. 1 and 2. This regulating member 24 is mounted upon a rod 25 and is held in position, that is, adjustably, by the nuts 26 and 27, as shown. The end 28 of said member 24, that is, as shown in Figs. 1 and 2, is provided with an aperture 29 through which the threaded rod 30 extends, and mounted upon the outer portion of this rod 30 is a threaded thumb nut 31, by which the tension of the regulating member 24 is gaged, as is evident on an examination of Fig. 1.

In Fig. 3 the regulating member has an oscillating movement, that is, when the diaphragm is expanded through the medium of high pressure of gases or fluids, and the oscillation of this member is obtained by mounting the said member in such a manner as to form a pivot therefor, by beveling the nuts 26 and 27 which are mounted on each side of the said member. This regulating member is of a reversed L-shape, forming a lateral extending arm 32, upon which a threaded weight is mounted, and by manipulating this weight backward and forward the pressure of gases or fluids passing through the device is regulated, as will be clearly manifest.

From the foregoing, the essential features, elements and the operation of the device, together with the simplicity thereof, will be clearly apparent.

Having thus fully described the invention, what is claimed as new and useful, by the protection of Letters Patent, is:—

1. In a regulator, a casing having a pressure chamber, a disk threaded thereto, an inlet and outlet therefor, a valve having a rod for the inlet, a diaphragm having a circumferential bulged flange secured to the disk, means for securing the flange to the circumference of said disk, said diaphragm being centrally apertured, said rod extending through the aperture, and means threaded to the rod and engaging opposite faces of the diaphragm, movable means designed for coaction with the said rod, threaded means projecting laterally from the disk and extending through the same near its periphery and to which the movable means is adjustably secured and means threaded upon said lateral projecting threaded means for adjusting the movable means.

2. In a regulator, a casing, a disk having an annular bead or raised portion threaded to the casing, an inlet and outlet therefor, a valve and rod for the inlet, a diaphragm having a circumferential bulged flange secured to the disk, means for securing the flange to the circumference of said disk, said diaphragm being bent circumferentially upon itself so as to form an annular portion designed to engage the said bead or raised portion and to allow for expansion and vibration of the diaphragm, said diaphragm being centrally apertured, said rod extending through the aperture, and means threaded to the rod and engaging opposite faces of the diaphragm, a leaf spring disposed across the diameter of the diaphragm and spaced apart therefrom, threaded means projecting laterally from the disk and extending through the same near its periphery and to which the said leaf spring is adjustably secured, nuts threaded upon one of said lateral projecting threaded means, one upon each side of the leaf spring, for adjusting that end of the spring, and a wing nut threaded to the other lateral projecting threaded means for adjusting the tension of the spring.

In testimony whereof I have signed my name to this specification in the presence of two subscribing witnesses.

ANDREW SCHUM.

Witnesses:
JOSEPH JELLIG,
FRANK P. DILGER.